(No Model.)

J. TOCIN.
STOVE PIPE.

No. 461,058. Patented Oct. 13, 1891.

Witnesses.
James Sangster,
J. M. Caldwell.

Inventor.
Joseph Tocin

UNITED STATES PATENT OFFICE.

JOSEPH TOCIN, OF BUFFALO, NEW YORK.

STOVE-PIPE.

SPECIFICATION forming part of Letters Patent No. 461,058, dated October 13, 1891.

Application filed December 13, 1890. Serial No. 374,532. (No model.)

*To all whom it may concern:*

Be it known that I, JOSEPH TOCIN, a citizen of the United States, residing in Buffalo, in the county of Erie and State of New York, have invented certain new and useful Improvements in Stove-Pipes, of which the following is a specification.

My invention consists in certain improvements in sheet-iron stove-pipe joints, whereby a large portion of the heat that usually passes off through the pipe is caught and thrown out into the room, all of which will be fully and clearly hereinafter described and claimed, reference being had to the accompanying drawings, in which—

Figure 1:
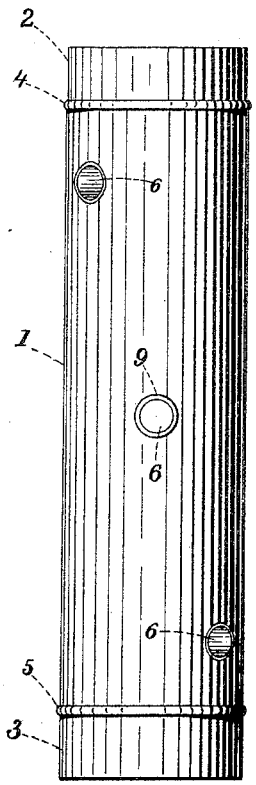
Figure 2:
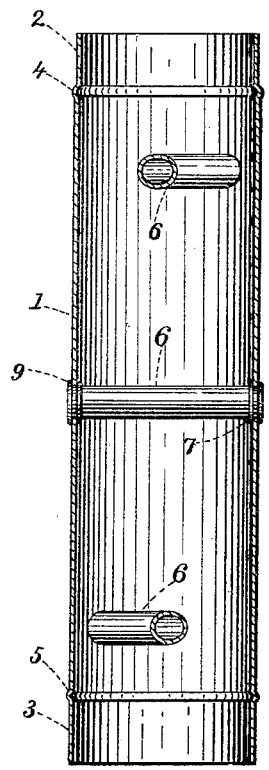
Figure 3:
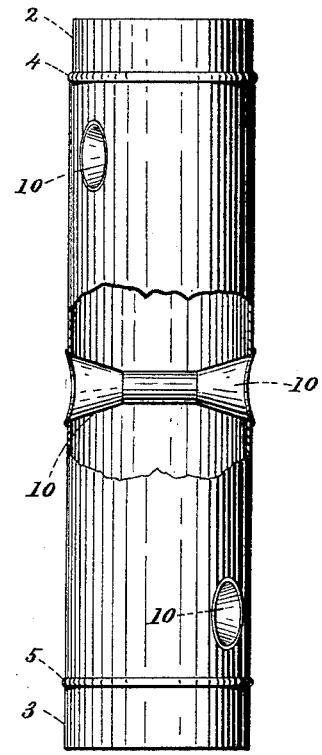
Figure 4:
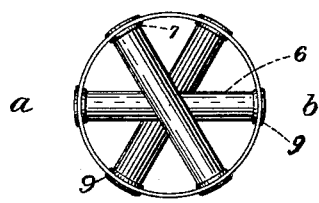
Figure 5:

Figure 1 is a side elevation of a joint of pipe made in accordance with my invention. Fig. 2 is a vertical section in line *a b*, Fig. 4. Fig. 3 is a side sectional elevation of a joint of stove-pipe, showing a modification of the same, a portion being broken away to show one of the transverse pipes. Fig. 4 is a top plan view. Fig. 5 is a detached side elevation of one of the transverse tubes before being put into a joint of pipe.

In said drawings, 1 represents a joint of pipe. 2 is the contracted or small end adapted to slip into the large end 3 of another similar joint of pipe. This is a common construction and is arbitrary, so that a series of such joints can be put together in the well-known way, otherwise it would not be a joint of stove-pipe, because it would be impossible to put it together as such.

At the top of the pipe 1 is the usual surrounding bead or rib 4 to prevent the joints from slipping too far into each other, and at the bottom of the joint is another bead 5 for the same purpose. After the joint of pipe is formed and put together by "double-seaming" in the usual way a series of small transverse tubes 6, having a surrounding bead 7 near each end, are forced down into the pipe, which will spring sufficiently to allow them to be put in that way, and when the ends come opposite the holes (previously put in the joint of pipe and adapted to receive the ends of the tubes) the ends 8 (see Fig. 5) pass through the pipe until stopped by the beads 7. As the pipe again springs into shape the ends 8 are then turned over, substantially as shown in Fig. 2, thereby forming a flange 9, which tightly incloses the sides of the pipe to which it is connected between the flange 9 and the beads 7, thereby fastening the tubes rigidly in place, substantially as shown in Fig. 3. These transverse pipes are preferably arranged, substantially as shown in Figs. 1, 2, and 4, so as to be located spirally around the pipe, or substantially so. If desired the transverse tubes may be enlarged at each end, substantially as shown at 10 in Fig. 3. The object of this construction is to provide the means for receiving a portion of the heat that usually passes off out of the chimney and conduct it through the transverse tubes or pipes 6 into the room in which the stove is located.

The object in arranging the transverse tubes 6 spirally around the pipe is to provide a passage-way for the heated products of combustion that will tend to lengthen their passage without materially decreasing the speed of their movement through it and thereby interfere with the draft of the stove to which the pipe may be attached by causing it to move in a spiral direction through the pipe, and thus part with more of its heat on its course than it would if it passed in a shorter straight direction through it. The heated products of combustion more completely surround each of the tubes 6 as they pass along by reason of this spiral or rotary movement, and thus impart more heat to them than if they passed up in a direct line.

The tubes 6 being spirally arranged within the pipe, it requires at least three of such tubes within each pipe-joint, so that when a series of such are put together a substantially continuous spiral passage way is formed, because it causes the heated air and other gases to take a forward spiral movement as they go through the pipe as above mentioned.

I am aware that stove-pipe joints have heretofore been made having transverse tubes located slightly above and at right angles to each other. I therefore do not claim such construction, broadly; but What I do claim is—

As an article of manufacture, a stove-pipe joint having permanently secured thereto a series of transverse pipes located spirally within it, so as to give a spiral direction to a current of air or gas passing through it, substantially as and for the purposes described.

JOSEPH TOCIN.

Witnesses:
JAMES SANGSTER,
JENNIE M. CALDWELL.